United States Patent [19]

Hartner

[11] Patent Number: 4,908,177

[45] Date of Patent: Mar. 13, 1990

[54] FIELD MARKING OF ELECTRICAL WIRING

[76] Inventor: Ralph D. Hartner, 5719 Sloan, Kansas City, Kans.

[21] Appl. No.: 274,510

[22] Filed: Nov. 22, 1988

[51] Int. Cl.[4] .......................... C04B 41/00; B29C 41/00; B29C 61/00

[52] U.S. Cl. .......................................... 264/132; 40/316; 156/85; 264/230; 269/47; 29/447

[58] Field of Search .......................... 29/447, DIG. 35; 156/85; 269/47; 40/316; 264/230, 232; 206/345, 132

[56] References Cited

U.S. PATENT DOCUMENTS

| | | | |
|---|---|---|---|
| 3,040,385 | 6/1962 | Falta | 264/230 |
| 3,650,059 | 3/1972 | Johnson | 40/316 |
| 4,032,010 | 6/1977 | Evans | 40/316 X |
| 4,206,909 | 6/1980 | Wintle | 40/316 X |
| 4,336,087 | 6/1982 | Martuch et al. | 156/85 |
| 4,378,648 | 4/1983 | Loof et al. | 40/316 |
| 4,425,390 | 1/1984 | Changani et al. | 264/230 X |
| 4,432,129 | 2/1984 | Featsent | 29/447 |
| 4,586,610 | 5/1986 | Gandolfo | 206/485 |
| 4,603,924 | 8/1986 | Piana | 40/316 X |
| 4,636,271 | 1/1987 | Gandolfo | 40/316 X |

*Primary Examiner*—Charlie T. Moon
*Attorney, Agent, or Firm*—D. A. N. Chase; Joan Optican Herman

[57] ABSTRACT

An apparatus for the marking of wires and the like comprises a preparation board consisting of a base portion and a neck portion, the neck portion having an extension piece thereon with a plurality of spaced, essentially flat tabs extending therefrom. Flexible, tubular heat recoverable sleeves are positioned on the tabs in a temporarily deformed manner to present a flattened writing surface on each of the sleeves. After writing or otherwise placing identifying indicia thereon, the sleeves are removed from the tabs and recover their original tubular shape. The sleeves are then positioned coaxially about the wires to be identified, and are permanently heat shrunk thereon. The entire installation is accomplished at the job site.

3 Claims, 1 Drawing Sheet

FIELD MARKING OF ELECTRICAL WIRING

BACKGROUND OF THE INVENTION

This invention relates generally to the marking of electrical wires for identification purposes. This invention relates more particularly to the use of heat shrinkable tubing onto which identifications are permanently placed, and which are then permanently installed on electrical wires, the entire operation being accomplished at the job site.

Within the electrical industry, complicated electrical controls, power wiring and wiring to inputs and outputs of complicated programmable logic controllers for the controlling of machinery have made it necessary to develop a method of identifying wires throughout the electrical system. Without this wire identification, the troubleshooting and repairing often associated with electrical equipment would be practically impossible, as well as extremely time consuming.

The most common method employed today utilizes various types of numbers which come in a booklet form. The electrician peels off a number or a series of numbers which have adhesive backings thereon, and wraps these numbers around the wires for identification. This method is quite time consuming, and as the markers lose their adhesive quality over a period of time due to heat or oily conditions found on job sites, the markers have a tendency to fall off. The wires are then left with no identification, which can present problems as discussed above.

Within the last few years, various methods have been devised utilizing a heat shrinkable sleeve that is partially preshrunk on an assembly for the purpose of flattening the sleeve, as disclosed in Evans, U.S. Pat. No. 4,032,010 and in Gandolfo, U.S. Pat. No. 4,586,610. Once flattened, these sleeves may be marked by a computer or typewriter and then sent to the job site to be applied by the electrician on the job. This method is very tedious as there are often thousands of wires to be marked throughout the duration of the job, and locating the proper marker sleeve needed for each individual wire is very time consuming, and can thus become impractical. Also, sleeves are sometimes lost or damaged, and a replacement can not be readily made. The electrician must request that a new marker sleeve be made, and then wait until that new sleeve is delivered. A great deal of time can be wasted in this manner.

Accordingly, this invention provides a flat assembly analogous to a clipboard which lends support to the hand for the purpose of handwriting with a permanent marking ink pen on a flattened tubular heat shrinkable sleeve. The tubular sleeve is flattened by forcing it with a minimum amount of force onto a metal tab extending from the assembly. The sleeve is marked and then removed from the extension with a minimum amount of pulling force, at which time the sleeve recovers its original tubular form. It is then slipped onto the wire and heat shrunk firmly to the conductors for a permanent installation. This operation is accomplished entirely at the job site, without any of the aforementioned problems which have been associated with the marking of wires in the past.

OBJECT OF THE INVENTION

It is, therefore, the primary object of the present invention to provide a wire marking assembly which allows for the marking of electrical wires to be accomplished entirely on the job site.

It is another object of the present invention to provide a wire marking assembly as aforesaid wherein tubular marker sleeves can be easily and permanently marked at the job site.

It is a further object of the present invention to provide a wire marking assembly as aforesaid wherein the marked tubular sleeves can be easily and permanently installed on the electrical wires at the job site.

DESCRIPTION OF THE PREFERRED EMBODIMENT

Figure 1:
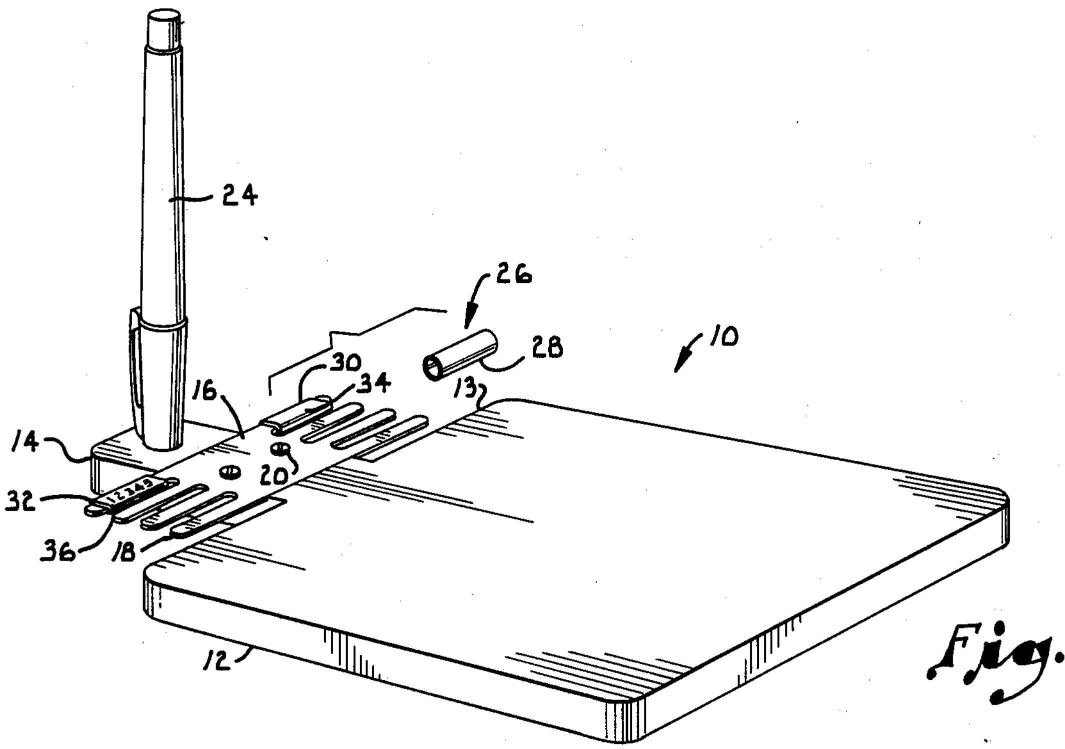
FIG. 1 is a perspective view of the wire marking assembly of the present invention showing one tubular sleeve temporarily flattened on a tab, and another sleeve not positioned on a tab.
Figure 2:
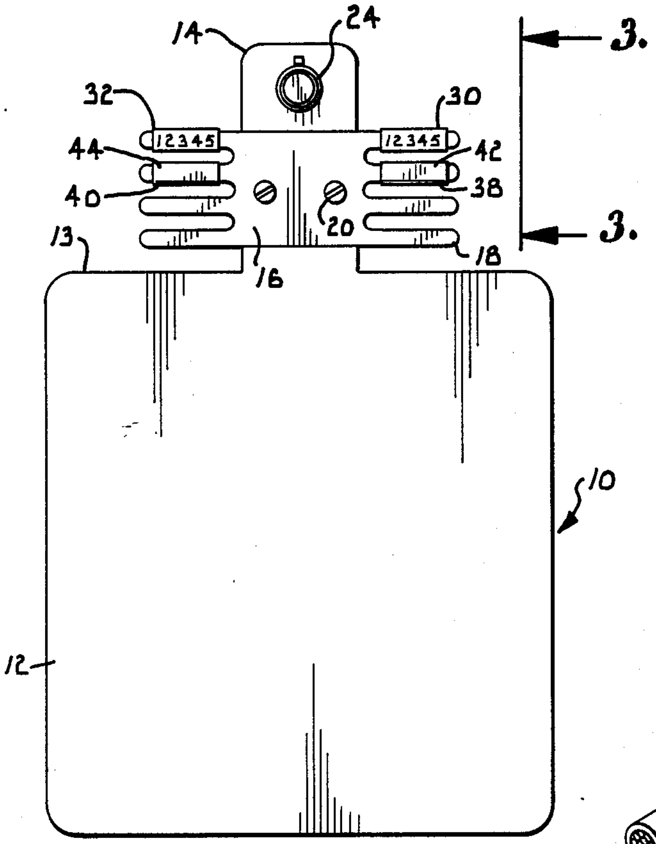
FIG. 2 is a top view of the wire marking assembly as aforesaid showing four tubular sleeves positioned on the tabs thereof.
Figure 3:
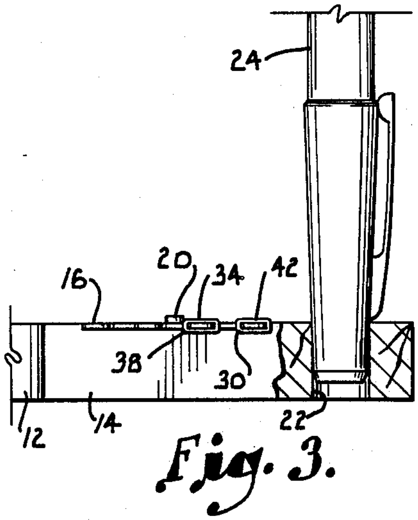
FIG. 3 is an enlarged elevational view taken along line 3—3 of FIG. 2, with a portion depicted in cross-section to show the placement of a pen within the marking assembly.

Referring initially to FIGS. 1 and 2, a field wire marking assembly is comprised of a preparation board generally referred to as 10, having a base portion 12 and a neck portion 14. The preparation board 10 is generally analogous to a clipboard. The base 12 has a leading edge 13 from which the neck portion 14 projects. The neck portion 14 is reduced in width as compared to the base portion 12, and has an extension piece 16 secured transversely thereon. A plurality of spaced, essentially flat tabs 18 project outwardly from the extension piece 16. The extension piece 16 can be secured to the neck portion 14 by any of a variety of known securing means, as by a pair of screws 20 as disclosed in FIG. 1. Alternatively, extension piece 16 can be integral with preparation board 10. The neck portion 14 is provided with an aperture 22 for selectively and relatively securely receiving therein an indelible pen 24 or the like. Aperture 22 is depicted in the cross-sectional portion of FIG. 3.

Flexible tubular sleeves, generally referred to as 26, are shown initially in FIG. 1. These sleeves 26 are made of a heat shrinkable material. The width of the tabs 18 is greater than the inside diameter of these sleeves 26 to enable the sleeves 26 to be positioned over the tabs 18 in a flattened configuration as shown in FIGS. 1 and 2. Furthermore, the sleeves 26 have a diameter greater than the wires 46 which they are used to identify, so that the sleeves 26 may be easily slipped into place over the wires 46 after they have been marked.

Sleeve 28 is shown in its original tubular form prior to positioning on the tabs 18. Two of the sleeves 30 and 32 are depicted positioned on the tabs 18 in a temporarily deformed manner so as to cause them to present flattened surfaces 34 and 36 respectively for writing thereon. FIG. 2 depicts two additional sleeves 38 and 40 thereon, having respective flattened surfaces 42 and 44. The flattened surfaces 34 and 42 presented when the sleeves 30 and 38 are deformably positioned on the tabs 18 can readily be appreciated by the view in FIG. 3.

Referring to FIG. 1, sleeve 30 is shown prior to the placement of identifying indicia thereon, and sleeve 32 is depicted after the addition of identify marking thereto. When the sleeves 30 and 32 are removed from the tabs 18, they recover their original tubular shape as illustrated by sleeve 28.

Figure 4:
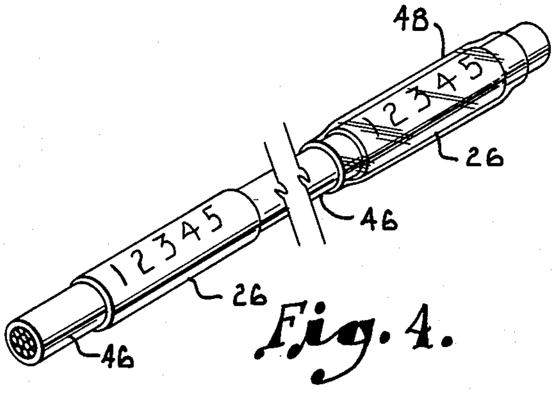
FIG. 4 is a perspective view of two tubular sleeves permanently installed on a wire according to the present invention, with one of the sleeves having a clear, protective cover installed thereover.

The drawing in FIG. 4 shows the sleeves 26 permanently positioned coaxially about the wires 46 which are to be identified. The firm fit achieved is accomplished by using conventional means to heat shrink the tubular sleeve 26 about the wire 46 after the marking has been accomplished. The sleeves 26 permanently retain the size achieved after the heat shrinking process has been applied. An alternative embodiment of the present invention utilizes an additional clear, flexible tubular sleeve 48 as a protective cover over the sleeve 26, the clear sleeve 48 also being made of a heat shrinkable material. The clear sleeve 48 is designed for coaxial placement about a marking sleeve 26 which has preferably already been heat shrunk onto a wire 46. As is depicted in FIG. 4, clear sleeve 48 is slightly longer than marker sleeve 26. The clear sleeve 48 is then heat shrunk to achieve a firm fit over both the marker sleeve 26 and the wire 46 for a permanent identification of the wire 46. Clear sleeve 48 can be used to prevent smudging of the identifying indicia placed on the sleeves 26.

In use, a flexible tubular sleeve 26 is deformably positioned over a projecting tab 18 to present a flattened surface for marking thereon. The electrician or other person marking the sleeve then removes the pen 24 or other marking device from the aperture 22 in the neck 14 of the preparation board 10 and uses it to place the appropriate identifying indicia on the sleeve 26. The preparation board 10 acts as a clipboard type apparatus which lends support to the hand of the electrician when he is writing on the sleeve 26. After replacing the pen 24 into aperture 22 to selectively secure it therein, the electrician removes the marked sleeve 26 from the tab 18. The sleeve 26 then recovers its original tubular shape.

The electrician next positions the sleeve 26 coaxially about the wire 46 which he intends to identify. Conventional means are employed to heat shrink the sleeve 26 until it is firmly secured onto the wire 46. The sleeve 26 as thus installed onto the wire 46 at the job site is now permanently affixed thereto. If the sleeve 26 is somehow damaged during this process, the electrician simply uses the method outlined above to create another properly marked sleeve and secure it to the wire 46 as discussed above, with the entire installation being achieved at the job site.

It is to be understood that while certain forms of this invention have been illustrated and described, it is not limited thereto, except insofar as such limitations are included in the following claims.

Having thus described the invention, what is claimed as new and desired to be secured by Letters Patent is:

1. A method of marking electrical wires and the like, said method comprising:
   - providing a preparation board having a neck portion extending therefrom;
   - providing a plurality of spaced, essentially flat tabs extending outwardly from said neck portion;
   - deformably elastically flattening and positioning flexible, tubular heat recoverable sleeves on said tabs which are of widths greater than the internal diameter of said corresponding sleeves to present an essentially flat writing surface on each of said sleeves;
   - placing indicia on said flat writing surface to provide marked sleeves;
   - removing said marked sleeves from said, tabs whereby, said sleeves elastically recover their original heat recoverable tubular shape and diameter;
   - placing said marked sleeves coaxially about said wires having diameters less than that of said sleeves; and
   - permanently reducing the diameter of said heat recoverable sleeves by heat shrinking whereby said sleeves fit firmly about said wires.

2. The method as set forth in claim 1, further comprising:
   - positioning transparent, flexible, tubular heat recoverable sleeves coaxially about said heat shrunk, marked sleeves; and
   - permanently reducing the diameter of said transparent sleeves by heat shrinking whereby said transparent sleeves fit firmly about said heat shrunk, marked sleeves and said wires.

3. The method as set forth in claim 1, further comprising providing means on said neck portion for selectively securably receiving a pen or other marking apparatus.

* * * * *